Figure 1:
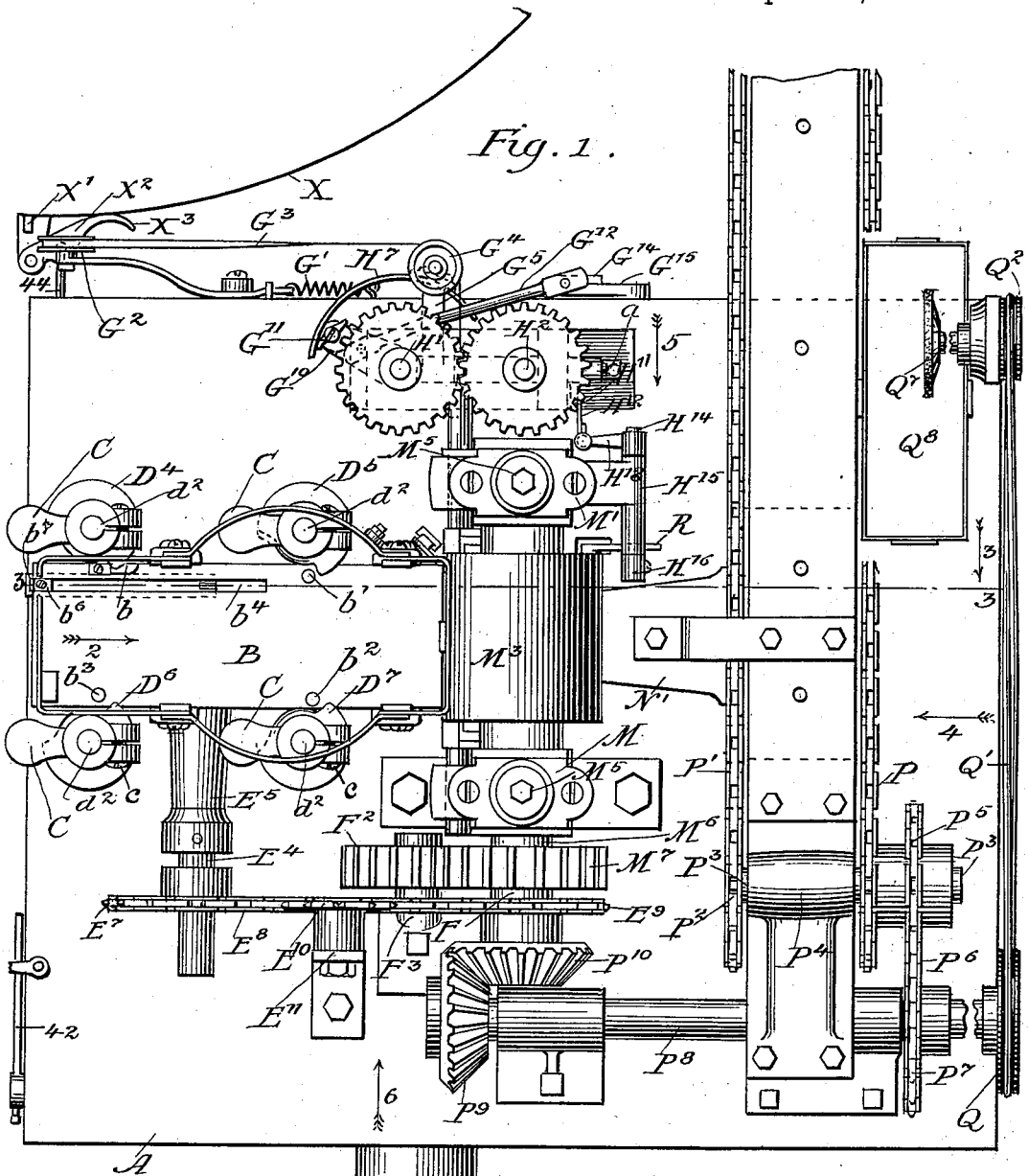

(No Model.) 9 Sheets—Sheet 2.

W. B. PAGE & A. E. HOPKINS.
SHEET TIN OPERATING MACHINE.

No. 590,709. Patented Sept. 28, 1897.

Witnesses:
Wm. M. Rheems
Do. Mitt. H. Chamberlin

Inventors
William B. Page
Archibald E. Hopkins
By Walter H. Chamberlin
Attorney.

(No Model.) 9 Sheets—Sheet 3.

W. B. PAGE & A. E. HOPKINS.
SHEET TIN OPERATING MACHINE.

No. 590,709. Patented Sept. 28, 1897.

Witnesses:
Wm. M. Rheems
DeWitt W. Chamberlin

Inventors
William B. Page
Archibald E. Hopkins
By Walter H. Chamberlin
Attorney.

(No Model.) 9 Sheets—Sheet 4.

W. B. PAGE & A. E. HOPKINS.
SHEET TIN OPERATING MACHINE.

No. 590,709. Patented Sept. 28, 1897.

Witnesses:
Wm. N. Rheem.
DeWitt N. Chamberlin

Inventors
William B. Page
Archibald E. Hopkins
By Walter H. Chamberlin
Attorney

THE NORRIS PETERS CO., PHOTO-LITHO., WASHINGTON, D. C.

(No Model.) 9 Sheets—Sheet 6.

W. B. PAGE & A. E. HOPKINS.
SHEET TIN OPERATING MACHINE.

No. 590,709. Patented Sept. 28, 1897.

Witnesses:
Wm. W. Rheem.
DeWitt H. Chamberlin.

Inventors
William B. Page
Archibald E. Hopkins
By Walter H. Chamberlin
Attorney

THE NORRIS PETERS CO., PHOTO-LITHO., WASHINGTON, D. C.

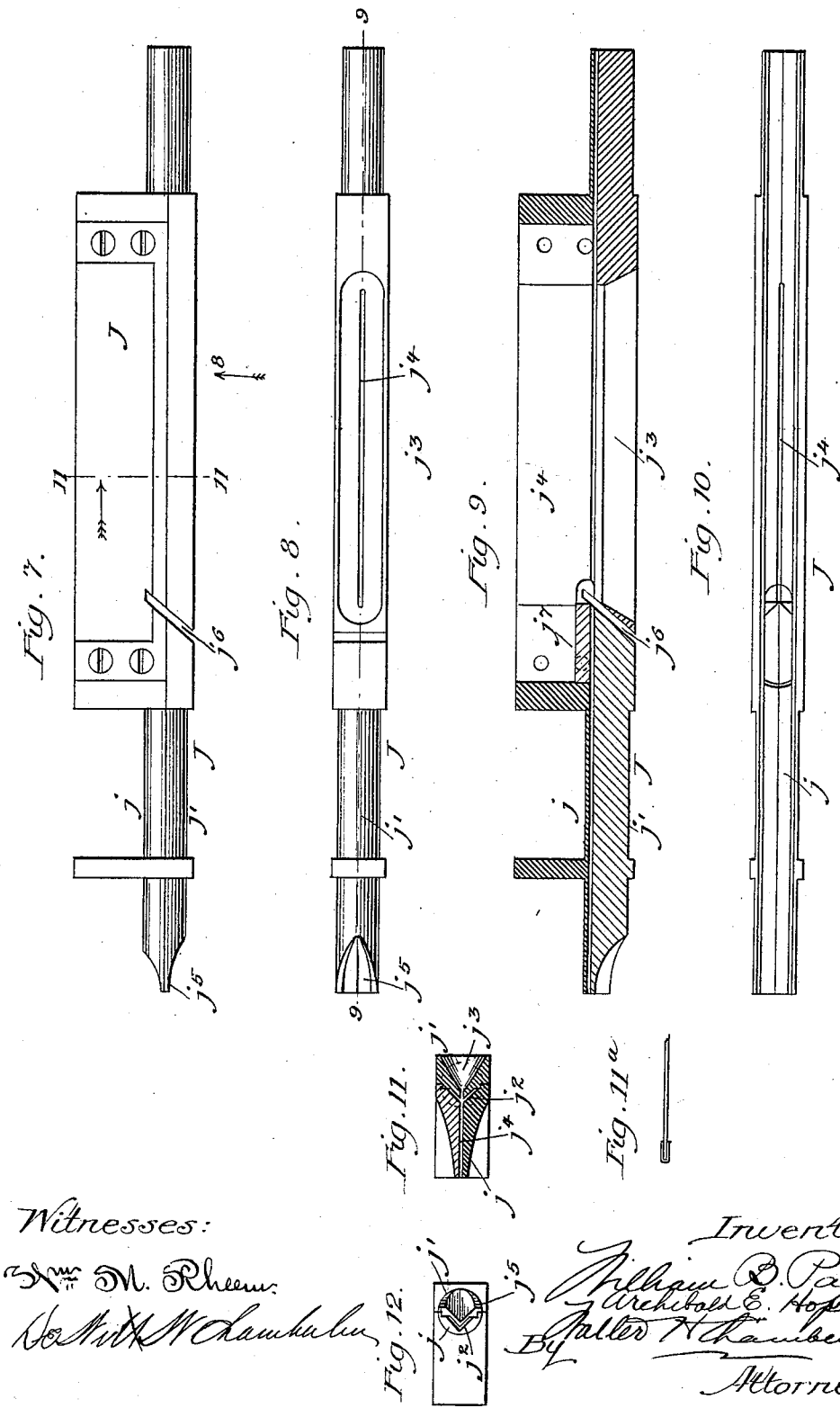

(No Model.) 9 Sheets—Sheet 8.
W. B. PAGE & A. E. HOPKINS.
SHEET TIN OPERATING MACHINE.
No. 590,709. Patented Sept. 28, 1897.
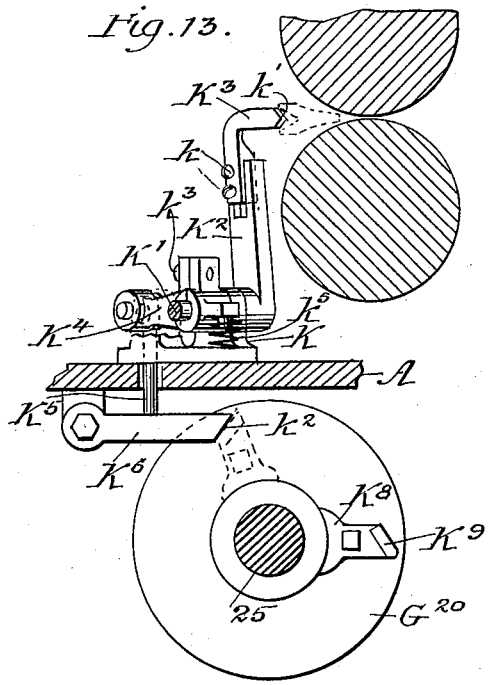
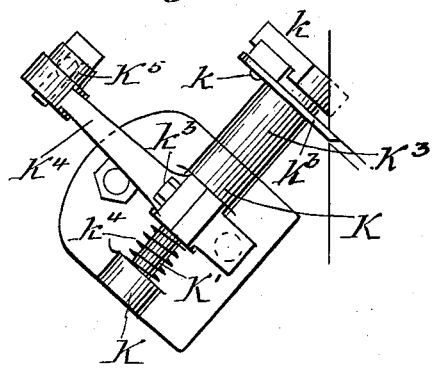
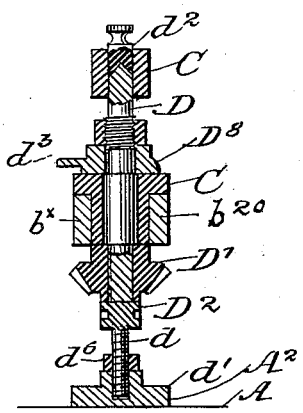
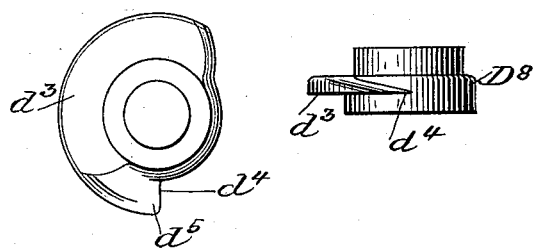
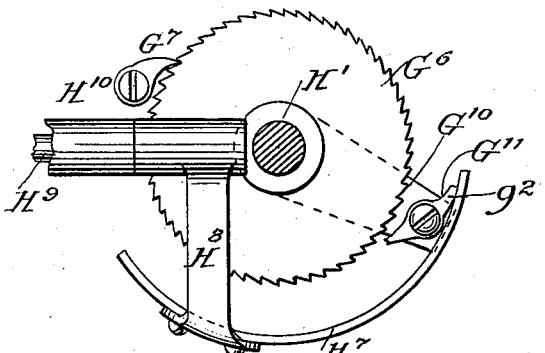
Witnesses:
Wm. W. Rheem
DeWitt W. Chamberlin
Inventors
William B. Page
Archibald E. Hopkins
By Walter H. Chamberlin
Attorney.

(No Model.) 9 Sheets—Sheet 9.
W. B. PAGE & A. E. HOPKINS.
SHEET TIN OPERATING MACHINE.
No. 590,709. Patented Sept. 28, 1897.
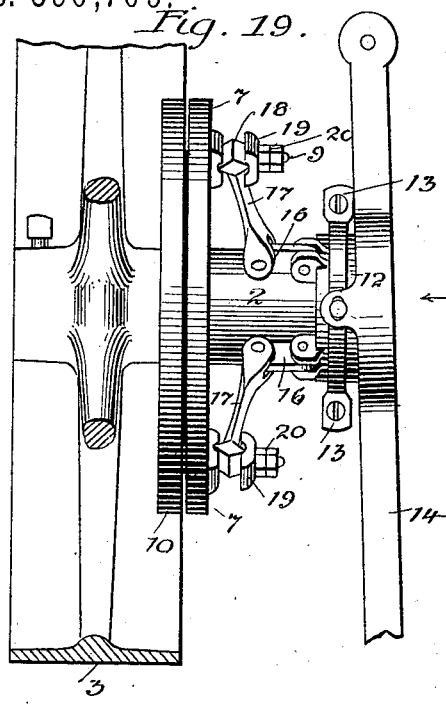
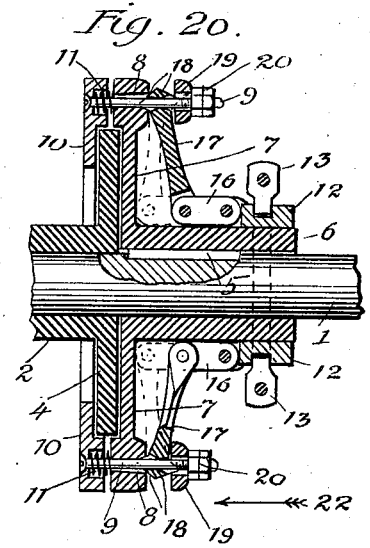
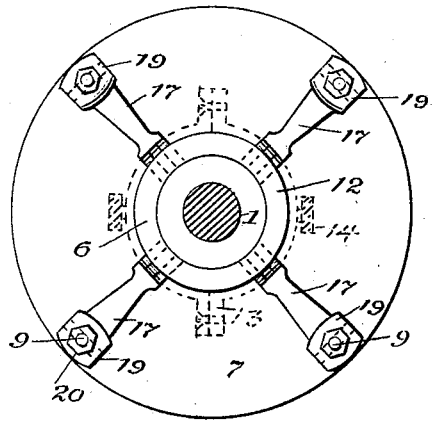
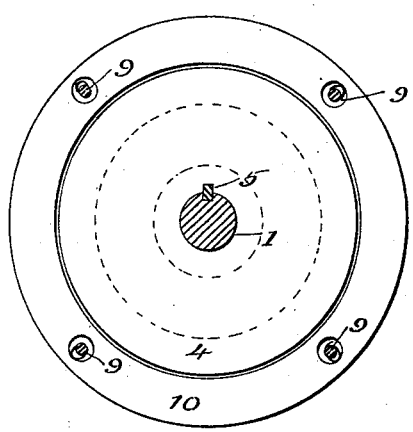
Witnesses:
Inventors
William B. Page
Archibald E. Hopkins
By Walter H. Chamberlin
Attorney

UNITED STATES PATENT OFFICE.

WILLIAM B. PAGE AND ARCHIBALD E. HOPKINS, OF DIXON, ILLINOIS.

SHEET-TIN-OPERATING MACHINE.

SPECIFICATION forming part of Letters Patent No. 590,709, dated September 28, 1897.

Application filed January 8, 1897. Serial No. 618,447. (No model.)

*To all whom it may concern:*

Be it known that we, WILLIAM B. PAGE and ARCHIBALD E. HOPKINS, citizens of the United States, residing at Dixon, county of Lee, State of Illinois, have invented a certain new and useful Improvement in Sheet-Tin-Operating Machines; and we declare the following to be a full, clear, and exact description of the same, such as will enable others skilled in the art to which it pertains to make and use the same, reference being had to the accompanying drawings, which form a part of this specification.

Our invention has for its object the production of a series of mechanisms for treating the blanks from which tin can-bodies are formed prior to their insertion into the body-forming machine; and our machine embraces, broadly speaking, first, mechanism for successively feeding the blanks from a pile or stack thereof; second, mechanism for shaping and cutting a strip of solder of the proper length and placing it in the proper position upon the blank; third, mechanism for hemming or engaging the strip of solder onto the blank at the desired point, and, fourth, mechanism for fluxing the strip of solder after it is placed on the blank.

The invention also contemplates other minor mechanisms, such as a new form of clutch mechanism, which will be hereinafter explained more in detail.

These mechanisms may of course be embodied in one organized machine, such as shown in the drawings of this application, or they may be separated and each set of mechanism be employed in connection with other styles of mechanisms.

Figure 2:
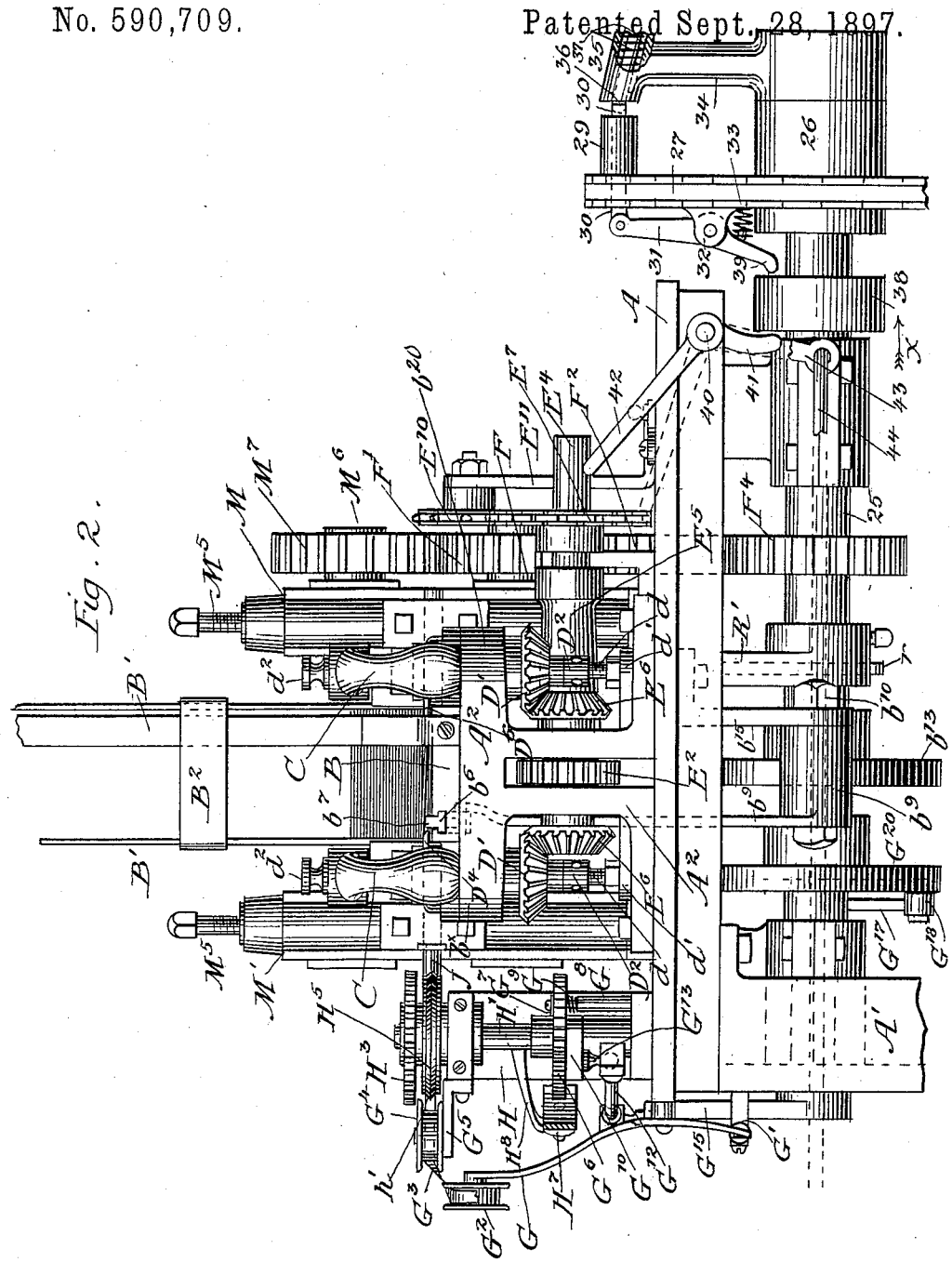
Figure 3:
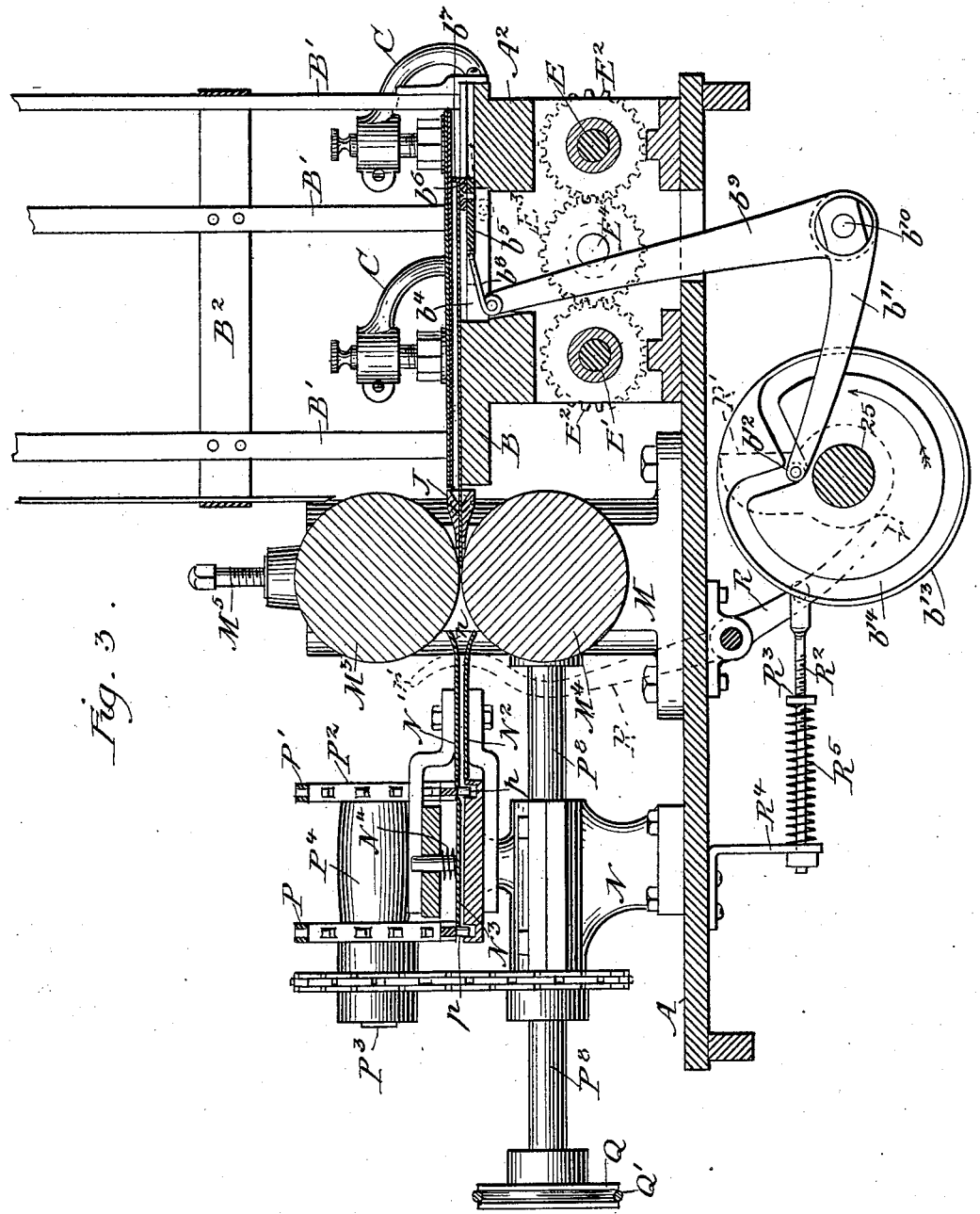
Figure 4:
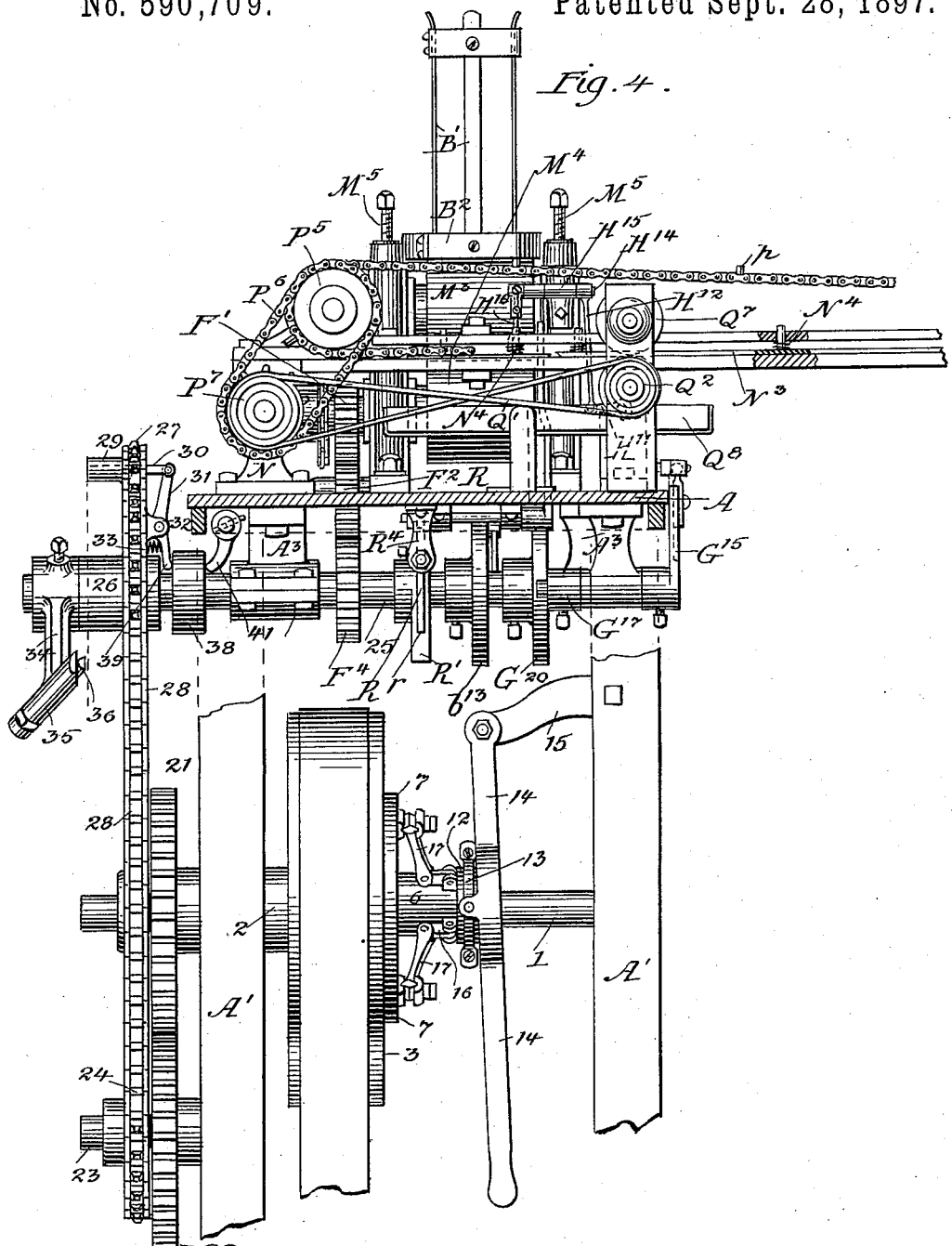
Figure 5:
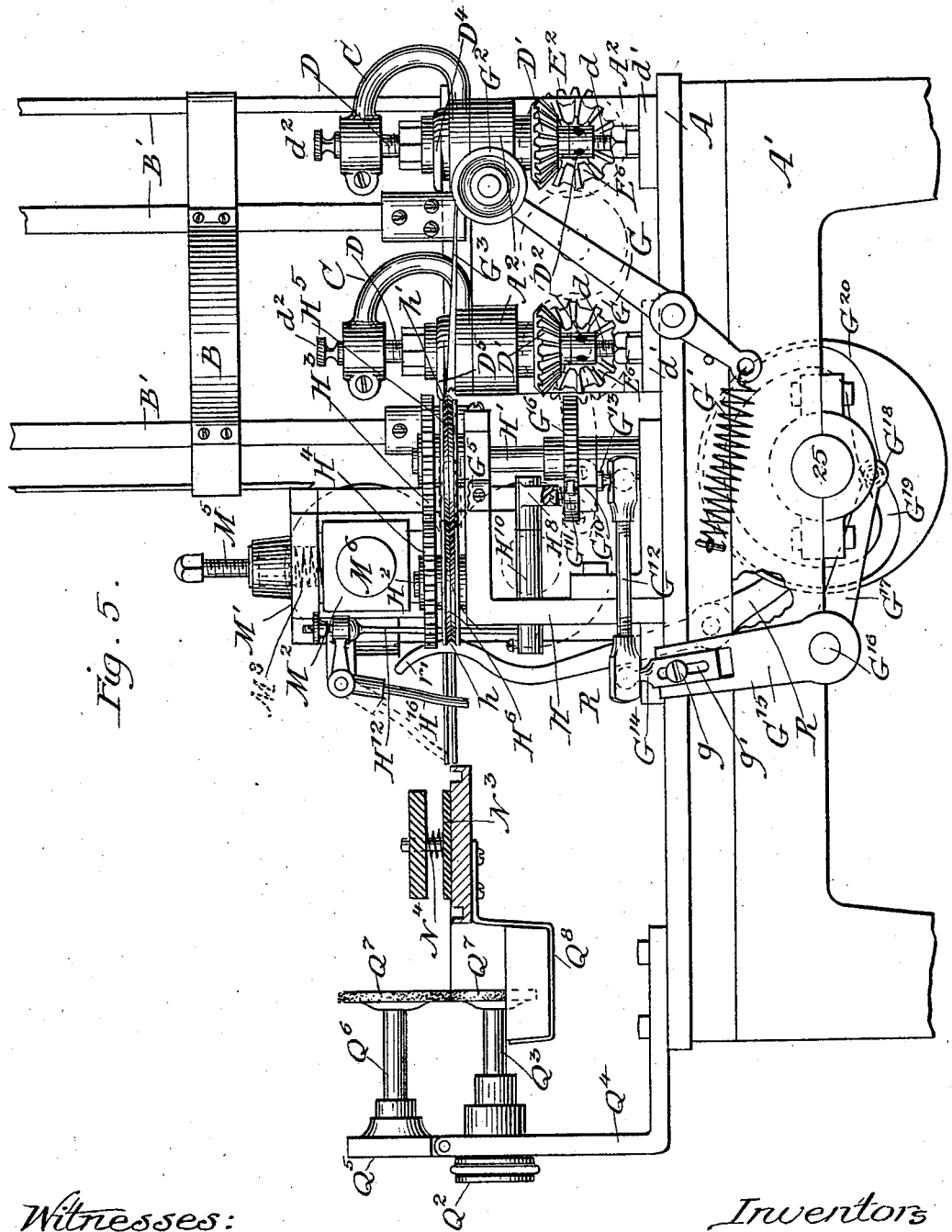
Figure 6:
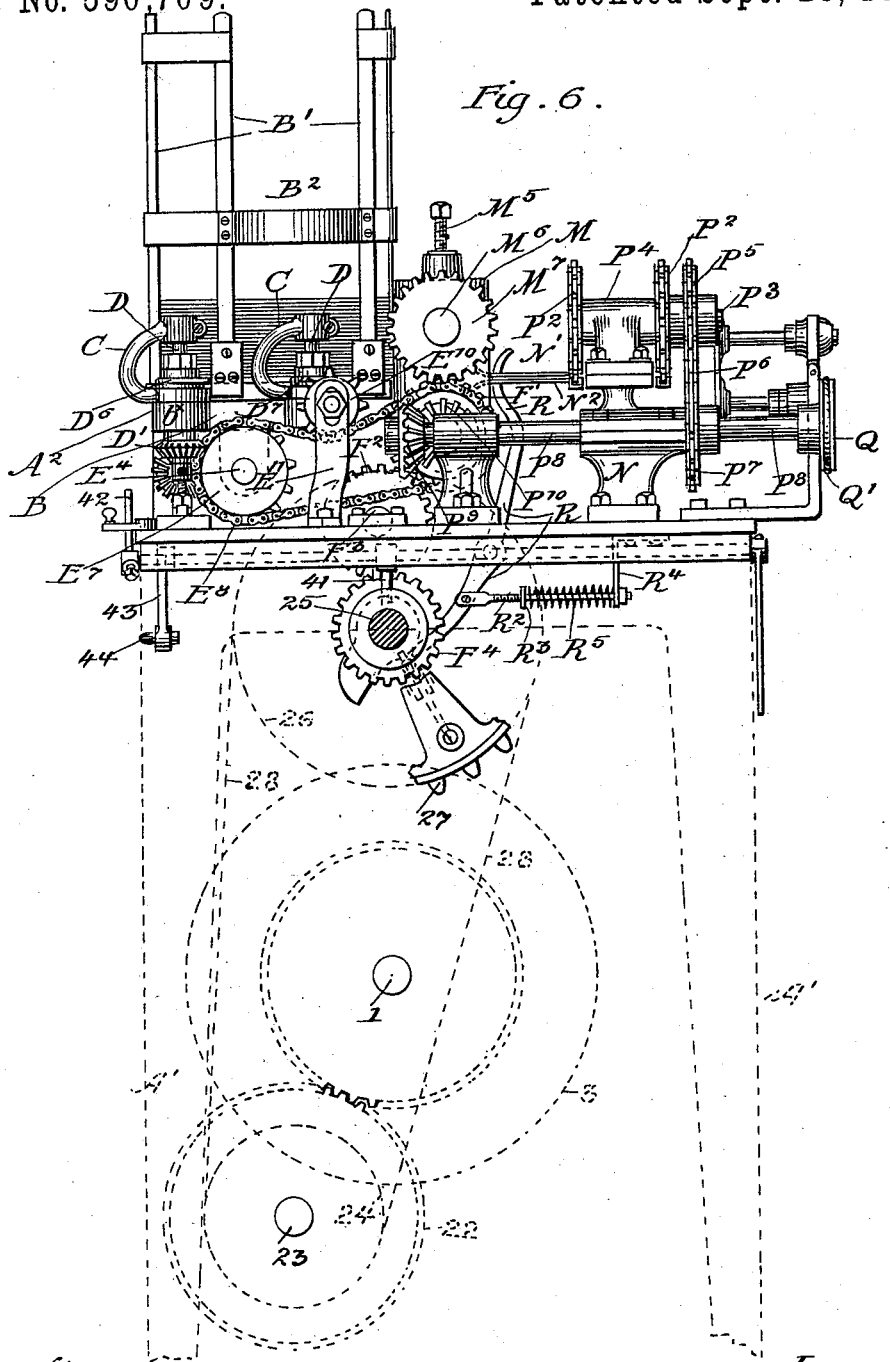

In the drawings, Figure 1 is a plan view of our machine. Fig. 2 is an end elevation looking in the direction of arrow 2, Fig. 1. Fig. 3 is a sectional view on the line 3 3 of Fig. 1. Fig. 4 is a side elevation looking in the direction of arrow 4, Fig. 1. Fig. 5 is an elevation looking in the direction of arrow 5, Fig. 1. Fig. 6 is an elevation looking in the direction of arrow 6, Fig. 1. Fig. 7 is a plan view of the solder-tube. Fig. 8 is an elevation in the direction of arrow 8, Fig. 7. Fig. 9 is a section on the line 9 9 of Fig. 8. Fig. 10 is a side elevation of the portion *j* of the solder-tube. Fig. 11 is a sectional view on the line 11 11 of Fig. 7. Fig. 11$^a$ is a detail of the end of the blank with the solder hemmed thereon. Fig. 12 is an end elevation of the solder-tube. Fig. 13 is a detail view of the hemming-rolls and the solder-cutting knife. Fig. 14 is a plan view of the solder-cutting knife. Fig. 15 is a sectional view of one of the shafts carrying the elevating-knives in the feeding mechanism. Fig. 16 is an enlarged plan view of one of these elevating-knives. Fig. 17 is a side elevation of the same. Fig. 18 is a detail view of the solder-feeding mechanism. Fig. 19 is a side elevation of the clutch mechanism. Fig. 20 is a sectional view of the same. Fig. 21 is an end elevation of the same, looking in the direction of arrow 21, Fig. 19. Fig. 22 is is an elevation of the flange 4 and disk, looking in the direction of arrow 22, Fig. 20.

In carrying out the invention A represents the main bed-plate or frame of the machine, supported from suitable standards A', it being of course understood that the size and the shape of the main supporting-frame is immaterial.

We will first describe the main driving mechanism for the entire machine.

1, Fig. 4, represents the main shaft, journaled in the standards A'. On the sleeve 2, which has a rotary motion around the shaft 1, is the belt-pulley 3, driven by a belt. This belt-pulley has its hub flanged, as at 4, Fig. 20. Carried by the shaft 1 and keyed thereto by the feather 5 is the hub 6, having the outwardly-extending flange 7. Through the outer rim of this flange 7 are orifices 8, through which are passed bolts 9. Supported by these bolts is a ring 10, adapted to embrace one side of the flange 4, while the flange 7 embraces the other side, and thus when the flanges 7 and 10 are brought together they clamp the flange 4 between them. Springs 11 tend normally to keep the flanges 7 and 10 apart, so that the flange 4 can freely revolve between them. On the hub 6 is a sleeve 12, engaged by a ring or yoke 13, the latter being engaged by a lever 14 and the end of the lever pivoted to an arm 15 on the standard A', Fig. 4. Thus a movement of the lever 14 will throw the sleeve 12 along the surface of the hub 6. Connected with the collar 12 by links 16 are levers 17, Figs. 19 and 20, one end of each lever 17 being pivoted to the link 16, while the other end is provided with an orifice which embraces the bolt 9.

The head of each lever 17 is beveled on each side, as at 18, one side of the head entering the orifice 8 in the flange 7, while the other side enters a button 19 on the bolt 9, locknuts 20 being employed to regulate the parts. It will thus be seen that when the parts are in the position shown by full lines, Fig. 20, the springs 11 tend to keep the flanges 7 and 10 apart, but when, through movement of the sleeve 12, the levers 17 are thrown to the position shown by dotted lines, Fig. 20, the leverage exerted by the levers 17 draws the flanges 7 and 10 together, and they clamp the flange 4 and hold it tightly. By the nuts 20 the driving capacity of the clutch is easily regulated. The band-pulley 3 is of course constantly revolving, and when the flange 4 is clamped it immediately gives rotation to the shaft 1. Located on the shaft 1 is a pinion 21, Fig. 4, which meshes with the pinion 22 on the stud 23, the latter being supported from the standard A'. On this stud and engaged to the pinion 22 is a sprocket-wheel 24. Supported from suitable standards $A^3$, Fig. 4, is a shaft 25. On this shaft is a hub 26, capable of rotation on the shaft 25 and carrying a sprocket-chain 28 with the sprocket-wheel 24. On the face of the sprocket-wheel 27 is a projecting sleeve or bearing 29, carrying a pin 30, Fig. 2. The end of this pin is pivoted to a lever 31, the lever being pivoted to a projection 32 on the face of the sprocket-wheel and a spring 33 tending to keep the lever 31 and pin 30 normally in the position in Fig. 2. Keyed to the shaft 25 is an arm 34, having on its end the sleeve 35, which, as shown in Fig. 4, is set at an oblique angle to its path of rotation. In this sleeve 35 is a pin 36, provided with a spring 37 to keep it normally in the position shown in Figs. 2 and 3. When the pins 30 and 36 are in the position shown in Fig. 2, the pin 30 will in its rotation engage the pin 36 and thus revolve the arm 34 and consequently the shaft 25. The end of the pin 36 is beveled, as shown in Fig. 4, so that in case an unusual strain comes on the mechanism, such as a clogging of the parts or the like, the spring 37 will yield and thus allow the pin 30 to pass the pin 36, so that the main shaft can continue to revolve while the mechanism stops.

Again, it is often desired to stop the mechanism for one revolution of the shaft or for a predetermined number of revolutions thereof. This we accomplish as follows: On the shaft 25 is a collar 38, adjacent to which the tail 39 of the lever 31 terminates. The collar 38 has a sliding motion on the shaft 25, and when moved in the direction of arrow X, Fig. 2, it strikes the tail 39 of the lever 31 and tilts the latter, thus withdrawing the pin 30, as shown in Fig. 4. Any suitable mechanism may be employed to move the collar 38. We have provided a rod 40, journaled in the bed-plate and provided with an arm 41, which when the rod is rotated will press against the collar 38 and move it. The rod 40 is provided with a hand-lever 42, and, if desired, may be provided with an additional arm 43 and a rod 44, pivoted thereto and extending to adjacent mechanism. We will at this point explain that our present machine has heretofore been used in connection with a rotary can-body-forming machine which takes the blanks as they are prepared by our present mechanism, forms them into a body, and solders them into that shape. It frequently happens that only a portion of the capacity of the can-body machine is used, or it happens that one or more of the sets of soldering mechanism is out of order. To provide for delivering to the can-body machine only the number of blanks required, we provide any suitable rotary part of the can-body machine—such, for instance, as indicated at X, Fig. 1—and at the proper intervals pins X'. Pivoted to the frame of the can-body machine is a lever $X^2$, one end $X^3$ terminating in the path of the pins X', while the rod 44 is pivoted to the body of the lever. Thus a tilting of the lever $X^2$ by the pin X' on the can-body machine exerts a push on the rod 44, which in turn rotates the rod 40 and through the collar 38 tilts the lever 31 and withdraws the pin 30, so that for that revolution the motion of the mechanism ceases.

We will now describe what we will term the "blank-feeding" mechanism. Extending from the bed-plate A, Figs. 1 and 2, are suitable standards $A^2$, and on the upper ends of these standards, and preferably integral therewith, is a plate B, Fig. 3. Extending upwardly from this bed-plate B are strips B', Fig. 3, connected by cross-strips $B^2$ and forming a rack or hopper in which the blanks are piled or stacked. Adjacent to this hopper and supported by the projections on the bed-plate B are standards or yokes C, there being two for each side of the hopper. Each of these standards forms a bearing for a shaft D. In Fig. 15 we have shown one of these shafts in detail, with adjacent parts in section. It will be observed that the shaft D is supported vertically at the lower end by the set-screw $d$ in the bearing $d'$ on the bed-plate, the head $D^2$ being employed to raise and lower the screw, while the lock-nut $d^6$ sets it. It is held from vertical movement at its upper end by the plug $d^2$. The standard C has its upper end split and held by the screw $c$ to clamp the plug $d^2$. Engaged on the shaft D is the beveled pinion D'. Above the beveled pinion is the projection $b^{20}$, extending from the bed B, and above this the lower end of the yoke C. Above the yoke is what we will term the "knives" $D^4 D^5 D^6 D^7$, Fig. 1. One of these knives is shown in Figs. 16 and 17. It consists of a hub proper, $D^8$, with a peripheral flange $d^3$, having a more or less sharpened edge $d^4$. This edge is preferably brought to more or less of a point, as at $d^5$, and the edge is preferably substantially radial with the shaft. It will be observed by reference to Fig. 1 that the shafts D are so arranged with respect to the hopper that as the knives revolve the edges thereof enter the hopper.

Journaled in the standards $A^2$, Figs. 2 and 3, are shafts E E', each carrying a pinion $E^2$, which meshes with a pinion $E^3$ on the shaft $E^4$, the latter being journaled in a sleeve $E^5$, supported by a suitable depending arm extending down from the bed-plate B, as indicated by dotted lines in Fig. 6. On each end of each shaft E E' is a beveled gear $E^6$, the beveled gears $E^6$ meshing with the beveled gears D' on the shafts D. Thus a rotation of the shaft $E^4$ revolves each of the shafts D, and consequently the knives $D^4$ to $D^7$. The shaft $E^4$ is driven by a sprocket-wheel $E^7$, Figs. 1, 2, and 6, a sprocket-chain $E^8$, and a sprocket-wheel $E^9$ on the shaft F, Fig. 1, the shaft F being driven by a pinion F', meshing with a pinion $F^2$ on the stud $F^3$, the latter supported from the bed, the pinion $F^2$ meshing with the pinion $F^4$ on the shaft 25, Fig. 6. If desired, an idler sprocket-wheel $E^{10}$, supported by the arm $E^{11}$, which extends from the bed-plate, may be employed to keep the sprocket-chain always taut. In the bed-plate B, Fig. 1, at each corner, are small blocks $b$ $b'$ $b^2$ $b^3$, there being one for each knife $D^4$ to $D^7$ and each block located substantially below the point where the knife enters the hopper above the bed-plate. We have found the best results have been obtained where the knives $D^6$ $D^7$ are about one-sixteenth of an inch above the bed-plate B, and the surface of the blocks $b^2$ $b^3$ is about one one-hundredth of an inch above the surface of the bed-plate, while the surface of the block $b'$ is about one one-hundredth of an inch above the surface of the bed-plate and the knife $D^4$ is about one thirty-second of an inch above the bed-plate, while the surface of the block $b$ is about one-fiftieth of an inch above the surface of the bed-plate. With this arrangement as the knives revolve the knives $D^6$ $D^7$ will enter the stack of plates and parting them will lift the bulk of the plates, while from three to six plates (depending upon the thickness of the plate) will rest upon the blocks $b^2$ $b^3$. The knife $D^5$ will as it enters the stack of plates part them and lift them all but perhaps one or two or sometimes three, while the knife $D^4$, entering the stack of plates, will part them, leaving but a single plate below the knife and lifting the balance. By thus parting the stack at a higher elevation on one side and leaving but a single plate below the knife at one point the necessity of accurate adjustment is largely obviated and mechanical accuracy insured. While the single plate is below the knife $D^4$ and the balance of the plates lifted away from it, a reciprocating block engages the corner of this lower plate and pushes it out of the hopper. This pushing mechanism we will now describe. In the bed-plate B is a slot $b^4$, Figs. 1 and 3. Working therein is a block $b^5$, carrying a smaller block $b^6$, the latter having a projection $b^7$, adapted to engage the corner of the lowermost plate in the hopper. The block $b^5$, Fig. 3, is connected by the link $b^8$ with one arm $b^9$ of a bell-crank lever on the stud $b^{10}$, the latter supported by the arm $b^{15}$, depending from the bed-plate A. On the end of the other arm $b^{11}$ is a roller $b^{12}$. On the shaft 25, Figs. 2 and 3, is a cam-plate $b^{13}$, having a cam-groove $b^{14}$, in which the roller $b^{12}$ travels, the cam-groove $b^{14}$ being so shaped that at regular intervals it will give a quick oscillation to the arm $b^{11}$, and consequently a quick reciprocation to the block $b^5$.

Briefly, the operation of this feeding mechanism may be described as follows: The knives $D^4$ to $D^7$, being revolved by the mechanism heretofore described, act to lift the main portion of the stack of plates in the hopper, leaving below the knives at one side of the hopper perhaps two or three or four plates, while below the knife at one corner there is but a single plate. After the lifting of the plates is accomplished the pushing-block $b^5$ is thrown forward and forces the lowermost plate out of the hopper, the block being thrown back to its initial position before the knives have completed their revolution and allow the stack of plates to drop down again.

We will now describe the mechanism for forming the strip of solder so that it may be properly engaged to the blank which later forms the can-body.

G, Fig. 5, is a lever pivoted to the frame A, one end connected by a spring G' to the frame A to exert a tension to keep the lever normally in the position shown in Fig. 5. On the upper end of the lever is a roller $G^2$, which carries a strip of solder $G^3$, or, if desired, the solder can be carried from any other source of supply.

H, Figs. 2 and 5, is a frame pivoted to the bed-plate A by the pivot $a$, Fig. 1, in which the solder forming and moving mechanism is carried.

H' is a vertical shaft carried by the frame H, said shaft having on its upper end a pinion $H^3$. This pinion meshes with a pinion $H^4$, carried by a roller $H^6$ on a stud $H^2$, so that a revolution of the shaft H' revolves the pinion $H^4$ and roller $H^6$. On the shaft H', below the pinion $H^3$, is a roller $H^5$. The roller $H^6$ has its periphery $h$ made V shape in cross-section, while the roller $H^5$ has its periphery of an inverted-V shape, as at $h'$.

$G^4$, Fig. 2, is a roller supported by the arm $G^5$ from the frame H and adapted to act as a guide-roller for the strip of solder. As will be seen, when the strip of soft solder is fed between the rollers $H^5$ $H^6$ it will not only be drawn along by the revolutions of the rolls, but it will take the V shape of the periphery of the rolls.

The revolution of the shaft H' is accomplished as follows: On the shaft is a ratchet-wheel $G^6$, Figs. 2, 5, and 18. A pawl $G^7$, (see Fig. 18,) pivoted to the upright $G^8$, Fig. 2, and kept in contact with the periphery of the ratchet-wheel by the spring $G^9$, (see Fig. 2,) prevents the ratchet-wheel from revolving except in one direction. Pivoted on the shaft $H'$ is an arm $G^{10}$, carrying a spring-impelled pawl $G^{11}$, Fig. 18, (the spring not being shown,) adapted to engage the teeth of the ratchet-wheel $G^6$. This arm $G^{10}$ is oscillated by means of the pitman $G^{12}$, engaged at one end by the projection $G^{13}$, Fig. 5, to the arm $G^{10}$ and at the other end to the adjustable arm $G^{14}$ on the end of the arm $G^{15}$. The latter is on the shaft $G^{16}$, and on the same shaft is an arm $G^{17}$, having a roller on its end $G^{18}$, which enters cam-groove $G^{19}$ of the cam $G^{20}$ on the shaft 25. It will be observed by reference to Fig. 5 that the engagement between the pitman $G^{12}$ and the arm $G^{14}$ and between the pitman $G^{12}$ and the arm $G^{13}$ is in each case a ball-joint. It will also be observed that the arm $G^{14}$ is adjustable on the arm $G^{15}$ by means of the set-screw $g$ and slot $g'$, so that the combined arm $G^{14}$ $G^{15}$ can be lengthened or shortened and thus vary the length of the path of oscillation of the arm $G^{10}$, and consequently vary the amount of solder fed.

In order that the feed of solder may be automatically stopped at intervals, (the necessity of which we will later explain,) we provide adjacent to the path of the movement of the pawl $g^{11}$ a curved arm $H^7$, adapted to engage the tail $g^2$ of the pawl and hold the pawl from engagement with the ratchet-wheel $G^6$. This curved arm $H^7$ is supported from the arm $H^8$, Figs. 5 and 18, the latter being on the shaft $H^9$, supported by the sleeve $H^{10}$ on the frame H. On the shaft $H^9$ is another arm $H^{11}$, Fig. 4, pivoted to the end of which is a pitman $H^{12}$, and at the other end of which is pivoted the arm $H^{13}$, Fig. 1. The arm $H^{13}$ is pivoted on a shaft $H^{14}$, supported from a sleeve $H^{15}$, carried by the standards of the hemming-rolls, (which we will presently describe.)

On the shaft $H^{14}$, Figs. 4 and 5, is an arm $H^{16}$. This arm $H^{16}$ is directly in the path of a blank, as it leaves the hemming-rolls, which acts to tilt the arm to the position shown by dotted lines, Fig. 5. This tilting of the arm $H^{16}$ acts through the parts just described to tilt the curved arm $H^7$ upward and clear of the pawl $G^{11}$, so that the latter can act on the ratchet-wheel $G^6$ and thus feed the solder. Thus as a blank is leaving the hemming-rolls and the mechanism, which we will presently describe, for hemming the solder onto the blank is empty, a new feed of solder is obtained; but while there is a blank in the hemming-rolls the arm $H^{16}$ is down or in the position shown in full lines, Fig. 5, and a feed of solder is prevented.

J is what we will term a "receiving-tube" for the solder, and is shown in detail in Figs. 7 to 12 and also in Fig. 3. It is made of two parts $j\,j'$, Fig. 11, the face of the parts $j$ being of a V shape in cross-section, while the adjoining face of the part $j'$ is an inverted-V shape, the result being a V-shaped slot $j^2$, extending the length of the tube. The part $j'$ has also a flaring front or mouth $j^3$, while the part $j$ has a horizontal slot $j^4$, extending backward from the V-slot $j^2$. This tube J is located with the end $j^5$ closely adjacent to the V-shaped rolls $H^5$ $H^6$, so that as the strip of solder is formed by the V-shaped rolls and discharged it enters the receiving-tube J and is forced along in said tube. In the tube J is a slot $j^6$, extending vertically through the tube, but placed in an inclined position with respect to the length of the tube. At the rear end of this slot is a steel piece $j^7$, forming an abutment against which the cutting-knife bears and between which and the cutting-knife the solder strip is cut, as will be hereinafter described. The cutting-knife works in this slot $j^6$ and cuts the requisite lengths of solder off from the strip that is forced into the tube. This cutter-knife we will now describe: Supported from the bed A of the machine is a bearing K, carrying a shaft $K'$. On this shaft is an arm $K^2$, carrying on its end the cutter-knife $K^3$, engaged to the arm $K^2$ by the screws $k$, Fig. 13. The end of the knife $K^3$ is V-shaped, as at $k'$, and sharpened. Upon the shaft $K'$ is another arm $K^4$, having the portion which embraces the shaft split and held by a set-screw $k^3$.

Surrounding the shaft $K'$ is a spring $k^4$, bearing on the arm $K^4$, and as the shaft has an endwise movement the spring $k^4$ tends to normally keep the knife against its bearing in the slot. A spring $k^5$ tends to normally keep the knife in the position shown in Fig. 13. Pivoted to the arm $K^4$ is a downwardly-projecting rod $K^5$, extending through the bed-plate and terminating adjacent to and above the pivoted arm $K^6$. This pivoted arm $K^6$ terminates closely adjacent to the cam-plate $G^{20}$, and on the face of the latter is an arm $K^8$, having a projection $K^9$, arranged in an inclined position, as shown, so that the revolution of the disk $G^{20}$ will bring the projection $K^9$ against the beveled end $k^2$ of the arm $K^6$ and will tilt the latter upward, thus thrusting the arm $K^5$ upward, which in turn tilts the arm $K^4$ and thus causes the knife to enter the slot $j^6$ and cut the strip of solder that is in the tube J. By reference to Fig. 14 it will be seen that the knife is beveled from its cutting edge backward. This fact, together with the inclined position of the slot $j^6$, causes the strip of solder after it has been cut to be forced along slightly in the tube J by the continued advancement of the knife, so that as the strip is picked up by the blank, as hereinafter described, the vertical plane of the end of the solder strip will be beyond the vertical plane of the edge of the blank, and as the solder strip is picked up and carried along by the blank there will be no projecting end of solder to catch and disarrange the parts.

We will now describe the mechanism for hemming the strip of solder onto the edge of the blank. Extending from the bed-plate A are standards M M'. Carried by these standards are boxings M², Fig. 5, and journaled in these boxings are the rolls M³ M⁴, Fig. 3. The boxings of the roll M³ are adjustable vertically by means of the screws M⁵, so that the distance between the two rolls can be easily varied, and the upper roll is normally held down by the springs M⁸, Fig. 5, so that the roll can accommodate itself to varying thicknesses of blanks. The roll M⁴ is mounted on the shaft F, which, as above explained, is driven by the pinion F' F² F⁴ from the shaft 25. The pinion F' on the shaft F meshes with the pinion M⁷ on the shaft M⁶ of the roll M³, so that the two rolls will revolve in unison and in opposite directions. By reference to Fig. 3 it will now be understood how the various parts above described coöperate with each other. By the intermittent feed of the solder a strip of the latter is forced into the tube J after being formed into a V shape and there cut off, as described. The lowermost blank in the hopper is forced forward, as described, the end entering the mouth $j^3$ of the tube J, and picking up the strip of solder forces it out through the slot $j^4$ to the rolls M³ M⁴, the latter hemming the solder onto the end of the blank. (Shown in Fig. 11ª.)

Extending from the bed-plate A are standards N, Figs. 3 and 6, which support the operative parts which we will now describe. Supported from the standard N is what I will term a "guideway" made up of the two plates N' N², Fig. 3. The ends of these plates are flared, as at n, and terminate closely adjacent to the rolls M³ M⁴, so that as the blank with the strip of solder hemmed thereon is discharged from the rolls it enters this guideway, and before the rear end of the blank has left the crimping-rolls the forward end has reached a point underneath the yielding plate N³, (made yielding by virtue of the springs N⁴,) lifted the latter, and held thereby until picked up by the lugs p on the endless feed-chain P P'. As will be seen by reference to Fig. 1, this feed-chain is composed of two parts, each part traveling on a sprocket-wheel P² on a shaft P³, the shaft being supported by the sleeve P⁴ and the latter supported from the bed-plate A. The opposite ends of the feed-chains pass over sprocket-wheels at the point where it is desired to deliver the blanks. These wheels are not shown, but the construction at this point would depend entirely upon the machine to which the blanks are delivered, and in case no other mechanism is desired at this point the sprocket-wheels for supporting the chains could be constructed by any person skilled in the art in any of the usual well-known ways. The shaft P³ is driven by a sprocket-wheel P⁵, a sprocket-chain P⁶, a sprocket-wheel P⁷ on the shaft P⁸, and the latter driven by a beveled gear P⁹, meshing with a beveled gear P¹⁰ on the shaft F. On the shaft P⁸ is a pulley Q, Fig. 1, carrying a belt Q', passing over a pulley Q², supported on a counter-shaft Q³, the latter supported by the arm Q⁴, extending from the bed-plate, Fig. 5. Pivoted to the arm Q⁴ is a bearing Q⁵, carrying a shaft Q⁶. On the end of each shaft Q³ Q⁶ is a disk of felt or equivalent material Q⁷, the peripheries of the two disks Q⁷ being in contact with each other. Below the lower disk Q⁷ is a vat Q⁸ for containing any suitable flux. Now as will be seen when the blank is discharged from the hemming-rolls and is picked up by the endless-chain carrier P P' it is carried along in the direction in which the chain is moving; but its forward end on which the strip of solder has been hemmed is not over far enough to pass between the fluxing-disks Q⁷. In order to carry it over to this point, we have provided the lever R, Figs. 3, 5, and 6, the lower end r of which terminates adjacent to a cam R' on the shaft 25, while the upper end is curved, as at r', so that it terminates closely adjacent to the hemming-rolls. Pivoted to the lower end of the lever is a rod R², having a set-nut R³, the end of the rod passing through an orifice in the arm R⁴ on the bed-plate A, Fig. 3, and the spring R⁵ being provided between the arm R⁴ and the set-nut R³. The position of the cam R' on the shaft 25 is such that at the proper time the cam will bear upon the end r of the lever R and tilt the upper end back to a position adjacent to the rear end of the blank as it leaves the hemming-rolls. Then as the blank is picked up by the endless chain P P' and moved along the rear end of the blank is brought in front of this arm R. At this time the cam R' runs off from the end r of the lever R and the spring R⁵, which has been compressed, returns the lever R to its normal position, and the lever thus engages the rear end of the blank and forces it over, so that the forward or solder end of the blank will be in line with the fluxing-disks. The endless chain P P' continues to slide the blank along until it has passed between the fluxing-disks, and as the latter have picked up flux from the vat the flux is distributed along the solder. The endless chain then carries the blank to the desired point for the next operation.

Inasmuch as we have described the operation of each set of mechanism independently, we do not consider it necessary to again describe the complete operation of the machine.

What we claim is—

1. In an organized machine the combination of the following mechanism to wit: mechanism for shaping a strip of solder to fit the end of a can-body blank; mechanism for feeding the blank to the strip and mechanism for engaging the strip of solder to the end of the blank, substantially as described.

2. In an organized machine the combination of the following mechanism to wit: mechanism for shaping a strip of solder to fit the end of a can-body blank; mechanism for engaging the strip to the end of the blank and mechanism for fluxing the strip after it is engaged to the blank, substantially as described.

3. In an organized machine the combination of the following mechanism to wit: mechanism for shaping a strip of solder to fit the end of a can-body blank; mechanism for separating a single blank from a series of blanks and carrying it to the strip of solder; mechanism for engaging the strip of solder to the blank and mechanism for fluxing the solder after it is engaged to the blank, substantially as described.

4. In an organized machine the combination of the following mechanism to wit: mechanism for shaping a strip of solder to fit a can-body blank; mechanism for separating a single blank from a series of blanks and carrying it to a strip of solder and mechanism for engaging the strip of solder to the blank, substantially as described.

5. In an automatic feed mechanism for a can-body blank the combination with a hopper having a bottom plate and a stack of blanks therein, of separator mechanism adapted to enter the hopper above the bottom thereof and separate the lower blank from the balance of the stack and independent mechanism for carrying said single lower blank from under the stack, substantially as described.

6. In an automatic feed mechanism of the class described the combination with a hopper and a stack of blanks therein, of a separating-knife adapted to periodically enter the hopper and separate the lower blank from the balance of the stack and independent mechanism for carrying said single lower blank from under the stack, substantially as described.

7. In an automatic feed mechanism of the class described, the combination with a hopper and a stack of blanks therein, of a separating-knife adapted to periodically enter the hopper at substantially one corner thereof and separate the lower blank from the balance of the stack at such point, and mechanism for engaging said lower blank substantially at the corner thereof and carry said lower blank from under the stack, substantially as described.

8. In an automatic feed mechanism of the class described the combination with a hopper and a stack of blanks therein, of a series of separating-knives adapted to periodically enter said hopper at different points and lift the bulk of the stack leaving at least one blank below the knives and means for engaging the lower blank and carrying it from under the stack, substantially as described.

9. In a machine of the class described the combination with a hopper and a stack of blanks therein, of a series of rotary knives having flanges adapted to periodically enter said hopper at different points and lift the bulk of the stack leaving at least one blank below the knives and means for carrying the lower blank from under the stack, substantially as described.

10. In a machine of the class described the combination with a hopper and a stack of blanks therein, of a series of rotary knives each having a flange adapted to periodically enter the hopper and lift the bulk of the stack, some of the knives adapted to enter the stack at such an elevation as to leave more than one blank below the knife and the knife at one corner adapted to leave but a single blank below it and means for carrying the lower blank from under the stack, substantially as described.

11. In a machine of the class described the combination with a hopper and a stack of blanks therein, of a series of rotary knives each having a flange adapted to periodically enter the hopper and lift the bulk of the stack leaving at least one blank below the knives and a reciprocating pusher-block adapted to engage the lower blank and carry it from under the stack, substantially as described.

12. In a machine of the class described the combination with a hopper and a stack of blanks therein, of a series of knives each adapted to enter the hopper and lift the bulk of the stack, some of the knives adapted to enter the stack at such an elevation as to leave more than one blank below them while the knife at one corner is adapted to leave but a single blank below it and a reciprocating pusher-block adapted to engage the lower blank and carry it from under the stack, substantially as described.

13. In a solder-forming mechanism the combination of a pair of solder-forming rolls having their peripheries shaped to bend a strip of solder into the desired shape in cross-section said rolls constituting at once the mechanism for feeding and the mechanism for forming the solder-strip, and a receiving-tube for the single strip, beyond the roll, substantially as described.

14. In a solder-forming mechanism the combination of solder-forming rolls between which the solder is passed the peripheries of said rolls shaped to give the desired cross-section shape to the strip of solder by bending the latter and a receiving-tube beyond the rolls shaped to correspond in cross-section to the shape of the strip of solder, substantially as described.

15. In a solder-forming mechanism the combination of solder-forming rolls for shaping the solder into the desired shape in cross-section, a receiving-tube beyond the rolls shaped in cross-section to correspond to the shape of the solder and a cutting-knife adapted to cut off the desired length of solder within the tube, substantially as described.

16. The combination with the solder-feeding rolls, of a tube for receiving said solder-strip, said tube shaped in cross-section to correspond with the cross-section of the solder-strip, said tube made in two longitudinal parts, substantially as described.

17. The combination of rolls constituting both the solder feeding and forming rolls, a tube beyond said rolls shaped in cross-section to correspond with the cross-section of the solder-strip after it is formed said tube made in two longitudinal parts, substantially as described.

18. The combination with the solder-forming rolls adapted to form the strip into a V shape in cross-section, of a receiving-tube beyond the rolls into which the solder is fed, said tube also V-shaped in cross-section, said tube having a flaring mouth opening from the base of the V shape and a slot extending from the point of the V shape, substantially as described.

19. The combination with the solder-forming rolls, of a receiving-tube beyond the rolls and a cutting-knife adapted to enter said tube at an oblique angle to the strip therein, substantially as described.

20. The combination with mechanism for feeding a strip of solder, of a reciprocating cutting-knife mounted on a bell-crank lever said knife extending at an angle from the arm of the lever on which it is mounted, substantially as described.

21. The combination with a pair of rolls constituting the mechanism for giving the solder the desired shape by bending and constituting also the feeding-rolls for the solder, mechanism for giving said rolls an intermittent motion and a knife for cutting said solder after it leaves the forming-rolls, substantially as described.

22. The combination of mechanism for giving the solder-strip the desired shape in cross-section, mechanism for holding the strip after it is formed until engaged by the blank mechanism for feeding the blank to the strip and mechanism for engaging the blank and strip together, substantially as described.

23. The combination of mechanism for shaping the solder-strip, mechanism for holding the solder until engaged by the blank mechanism for feeding the blank to the strip and a pair of rolls between which the solder and blank are passed to engage them together, substantially as described.

24. The combination of a pair of rolls for shaping the solder, a receiving-tube for the solder beyond the rolls adapted to hold the solder until engaged by the blank and a pair of rolls beyond the tube between which the solder and blank are passed and by which they are engaged together, substantially as described.

25. The combination of forming-rolls for shaping the solder, an intermittent feed for driving said solder, means for holding the solder until engaged by the blank, hemming-rolls for engaging the solder to the blank and mechanism beyond said rolls adapted to be engaged by the blank as it leaves the hemming-rolls, said latter-named mechanism connected with the intermittent feed mechanism whereby the solder will be fed only when a hemmed blank is leaving the hemming-rolls, substantially as described.

26. The combination of rolls for feeding the solder, a reciprocating pawl for driving said rolls, hemming-rolls for engaging the solder to the blank and mechanism beyond said hemming-rolls adapted to be engaged by the blank as it leaves the hemming-rolls and mechanism for engaging said pawl to prevent its operating the feeding-rolls, said latter mechanism connected with the mechanism beyond the hemming-rolls, substantially as described.

27. The combination with mechanism for feeding the solder-strip and mechanism for engaging the solder and blank together, of an arm beyond said latter mechanism adapted to be engaged by the finished blank, said arm connected with mechanism adjacent to the solder-feed mechanism and adapted when lifted by the blank to render the solder-feed mechanism operative but when disengaged by the finished blank to render the solder-feed mechanism inoperative, substantially as described.

28. The combination of the solder-strip-feeding rolls, a reciprocating pawl for operating said rolls, a tilting arm adapted to engage said pawl and render it inoperative, the blank-hemming rolls for engaging the strip of solder to the blank and an arm beyond said hemming-rolls adapted to be engaged by the blank as it leaves the hemming-rolls, said latter arm connected with the tilting arm and adapted when engaged by the blank to move the tilting arm away from the pawl and thus permit the latter to operate the solder-feeding rolls, substantially as described.

29. The combination with the solder-feeding rolls, of a frame in which said rolls are mounted, said frame pivotally engaged to the main frame, substantially as described.

30. The combination of the solder-feeding rolls and a reciprocating pawl for intermittently driving the same, said rolls and pawl mounted in a frame pivoted to the main frame, substantially as described.

31. The combination of the solder-feeding rolls and mechanism for driving the same intermittently, all mounted in a frame pivoted to the main frame, of a lever for actuating said driving mechanism said lever connected with the driving mechanism by a pitman and the pitman connected with the lever and with the driving mechanism by universal joints, substantially as described.

32. The combination of the solder-feeding rolls and mechanism for driving the same intermittently, all mounted in a frame pivoted to the main frame, of a lever for actuating said driving mechanism said lever connected with the driving mechanism by a pitman and the pitman connected with the lever and with the driving mechanism by ball-and-socket joints, substantially as described.

33. The combination with the solder-feeding mechanism, of a two-part lever for operating the same connected with said feeding mechanism by a pitman, said lever being extensible longitudinally, substantially as described.

34. The combination with the hemming-rolls for engaging the solder to the blank, of carrier mechanism adapted to engage the blank as it leaves the rolls and fluxing mechanism adjacent to the carrier for fluxing the blank as it is carried along by the carrier, substantially as described.

35. The combination with mechanism for carrying the blank, of fluxing rolls or disks between which the blank is passed, one of said disks having its shaft pivotally mounted so that it may be tilted away from the other disk, substantially as described.

36. The combination with the blank-hemming rolls for engaging the solder and the blank together, of a carrier mechanism adapted to engage the blank as it leaves the hemming-rolls and an oscillating arm for moving the blanks laterally with respect to the carrying mechanism, substantially as described.

37. The combination with a can-body-forming machine and the shaft of the automatic blank-feeding mechanism, of clutch mechanism between the main driving-shaft and the shaft of said feed mechanism, intermediate connections between said can-body-forming machine and said clutch mechanism and means on the can-body-forming machine for affecting the clutch mechanism through said intermediate connections, to throw the feed mechanism out of operation while permitting the operation of the can-body-forming machine, substantially as described.

38. The combination with a rotary part, of a can-body-forming machine and the shaft of the automatic blank-feeding mechanism, of clutch mechanism between the main driving-shaft and the shaft of said feed mechanism, one or more projections on the said rotary part of the can-body machine and intermediate connections between said projections and said clutch mechanism whereby each projection will affect the clutch mechanism and cause the shaft of the feed mechanism to cease for a predetermined number of revolutions, substantially as described.

39. The combination with the shaft, of driven mechanism and the main driving-shaft, of an arm on the former shaft and an arm driven from the main driving-shaft, said latter arm carrying a pin adapted to engage the arm on the shaft of the driven mechanism and means for withdrawing said pin to escape said arm when desired, substantially as described.

40. The combination with the shaft, of driven mechanism and the main driving-shaft, of an arm on the former shaft and an arm driven from the main driving-shaft, said latter carrying a pin adapted to engage the arm on the shaft, of driven mechanism and a lever connected with said pin for withdrawing it, said lever operated by a sliding collar on the shaft, of driven mechanism and a lever pivoted to the frame of the machine for moving said collar, substantially as described.

41. The combination with the shaft, of driven mechanism and the main driving-shaft, of an arm on the shaft of the driven mechanism provided with a spring-impelled pin having a beveled end, an arm driven from the main driving-shaft carrying also a pin adapted to engage the first-named pin in its revolutions and means for withdrawing the last-named pin when desired, substantially as described.

42. A clutch mechanism consisting of a shaft, a driven pulley, a flange thereon, a movable sleeve on the shaft adjacent to the flange, said sleeve provided with a flange having its face parallel with the face of said driven-pulley flange, a series of bolts extending through the outer edge of the sleeve-flange and provided with mechanism for engaging the opposite side of the driven-pulley flange, a series of levers one for each bolt engaging both the sleeve-flange and the end of the bolt whereby when the levers are tilted they will move the bolts with respect to the sleeve-flange and clamp the driven-pulley flange against the sleeve-flange, substantially as described.

43. A clutch mechanism consisting of the shaft 1, driven-pulley flange 4, sleeve 6, sleeve-flange 7, ring 10, bolts 9 extending through said sleeve-flange 7 and engaging the ring 10, spring 11, lever 17 having heads 18 which engage the bolts, adjustable nuts 20 and means for tilting the levers 17, substantially as described.

In testimony whereof we sign this specification in the presence of two witnesses.

WILLIAM B. PAGE.
ARCHIBALD E. HOPKINS.

Witnesses:
W. McBRIDE,
G. B. BRUBAKER.